United States Patent
Feigl

(10) Patent No.: US 9,523,281 B2
(45) Date of Patent: Dec. 20, 2016

(54) BLADE FOR A WIND TURBINE

(75) Inventor: Luca Feigl, Barcelona (ES)

(73) Assignee: ALSTOM Wind, S.L.U., Barcelona (ES)

( * ) Notice: Subject to any disclaimer, the term of this patent is extended or adjusted under 35 U.S.C. 154(b) by 755 days.

(21) Appl. No.: 13/880,961

(22) PCT Filed: Nov. 10, 2011

(86) PCT No.: PCT/EP2011/069822
§ 371 (c)(1),
(2), (4) Date: Apr. 22, 2013

(87) PCT Pub. No.: WO2012/062846
PCT Pub. Date: May 18, 2012

(65) Prior Publication Data
US 2013/0209257 A1      Aug. 15, 2013

(30) Foreign Application Priority Data

Nov. 11, 2010   (EP) ..................................... 10382295

(51) Int. Cl.
| | |
|---|---|
| *F03D 11/00* | (2006.01) |
| *F01D 5/30* | (2006.01) |
| *F03D 1/00* | (2006.01) |
| *F03D 1/06* | (2006.01) |

(52) U.S. Cl.
CPC .................. *F01D 5/30* (2013.01); *F03D 1/001* (2013.01); *F03D 1/0658* (2013.01); *F03D 80/00* (2016.05); *F05B 2230/604* (2013.01); *Y02E 10/721* (2013.01); *Y02E 10/722* (2013.01); *Y02E 10/728* (2013.01); *Y02P 70/523* (2015.11); *Y10T 29/49336* (2015.01)

(58) Field of Classification Search
CPC .......... F01D 5/30; F03D 1/0658; F03D 1/001; F03D 11/00; F05B 2230/604
See application file for complete search history.

(56) References Cited

U.S. PATENT DOCUMENTS

| | | | |
|---|---|---|---|
| 4,260,332 A  * | 4/1981 | Weingart ................ | B64C 11/20 416/218 |
| 4,915,590 A | 4/1990 | Eckland et al. | |
| 2009/0317253 A1* | 12/2009 | Takata .................. | F03D 1/0658 416/134 R |

FOREIGN PATENT DOCUMENTS

| | | | |
|---|---|---|---|
| EP | 1 486 415 | 12/2004 | |
| ES | WO 2010149806 A1 * | 12/2010 | ........... F03D 1/0658 |
| WO | WO 2007/073735 | 7/2007 | |

OTHER PUBLICATIONS

International Search Report and Written Opinion for EP2011/069822, mailed Mar. 29, 2012, 11 pgs.

* cited by examiner

*Primary Examiner* — Craig Kim
*Assistant Examiner* — Jason Fountain
(74) *Attorney, Agent, or Firm* — Dority & Manning, P.A.

(57) ABSTRACT

A blade for a wind turbine comprising a blade root portion for attachment to a mounting flange of the wind turbine, the blade root comprising a plurality of first holes provided with an internal bushing wherein the bushings comprise a first end at or near a mounting surface of the blade root and an opposite second end embedded in their corresponding first holes, and wherein one or more internal bushing being guiding bushings, the guiding bushings comprising a first end that is adapted to guide the blade root with respect to a mounting flange.

13 Claims, 5 Drawing Sheets

BLADE FOR A WIND TURBINE

The present invention relates to a blade for a wind turbine and to a hub or extender of a wind turbine rotor.

The invention further relates to a method of coupling a blade root portion of a blade to a mounting flange and a method of correcting deformation of the blade root portion.

BACKGROUND ART

The blades in a wind turbine are typically attached, at a blade root portion, to a rotor hub, either directly or through an extender.

The blades in a wind turbine are typically made from composite materials: reinforcing fibres may be bonded to one another with a resin and, subsequently, cured to consolidate. Different kinds of fibres (e.g. glass, carbon, combinations) and resins (e.g. epoxy) may be used in different forms (e.g. prepreg, fibre sheets). Such composite materials may not have the structural integrity to provide a secure fixing mechanism into which, for example, threaded bolts may be directly inserted. For this reason, it is known for wind turbine blades to comprise metal inserts or bushings which are embedded into the blade root in a direction parallel to that of the longitudinal axis of the blade. Studs, bolts or rods can be used in combination with these bushings to achieve a secure connection between the hub or extender and the blade.

A manufacturing process of a blade of a wind turbine in general terms may comprise a first step of molding and curing two separate halves of the blade made out of composite material and a second step of unmolding these two halves and joining them together. Alternatively, a complete blade may be manufactured in a single molding step. Once the blade has been manufactured it remains in storage until the wind turbine is finally installed. Typically, said storage may last from one month up to one year.

Although blades are made from composite material in order to reduce its weight, it is important to consider the fact that a finished blade, made of composite, still has a considerable weight.

Therefore, a problem derived from above mentioned storage time is that the blade root portion deforms in the storage position due to the weight of the whole blade (see FIG. 4).

FIG. 4 schematically shows a blade for a wind turbine in a storage position. Arrow A shows the force of the weight acting on the blade root portion 11 that may cause deformation of the mounting surface 111 of the blade root portion.

The orientation of the blade in FIG. 4 is merely one of several possible storage positions. The ideal storage position may depend on the length of the blade, its shape, its curvature and other design parameters of the blade.

Another problem, related to the one mentioned above derives from speeding up the manufacturing process of the blade. Blades or blade halves are often taken out of the mold when the curing process is not yet completely finished. The resin is thus still partly soft and the blade can thus more easily deform under its own weight.

In practice, the deformation of the blade root can lead to a more vulnerable attachment at the hub. The attachment holes of the blade may not be completely aligned with the attachment holes of the hub or extender, and the studs or bolts used for connecting the blade to the hub may not be completely centered in their holes. In operation, they thus may be subjected to transverse loads, potentially shortening their lifetime and the lifetime of the blades.

SUMMARY OF THE INVENTION

It is an object of the present invention to at least partially overcome some of above mentioned drawbacks.

In a first aspect, the invention provides a blade for a wind turbine comprising a blade root portion for attachment to a mounting flange of the wind turbine, the blade root comprising a plurality of first holes provided with an internal bushing wherein the bushings comprise a first end at or near a mounting surface of the blade root and an opposite second end embedded in their corresponding first holes, and wherein one or more internal bushings are guiding bushings, the guiding bushings comprising a first end that is adapted to guide the blade root with respect to the mounting flange.

In this aspect of the invention, the first ends of the guiding bushings can act as a guidance for the first holes of the blade root towards second holes provided in the mounting flange. The first holes of the blade root may thus be more easily aligned with the second holes of the mounting flange.

Additionally, in this aspect, due to the alignment of the first holes and second holes, the fasteners that may be inserted in the holes for securing the blade to the hub or extender will not make contact with the inner walls of these holes. The lifetime of the fasteners and the blades may thus be increased.

In some embodiments, the first ends of the one or more guiding bushings may comprise an extension protruding beyond its corresponding first hole adapted to guide the blade root with respect to the mounting flange.

In some embodiments, the first ends of the guiding bushings or its extensions may comprise a decreasing outer diameter.

In other embodiments, the first ends of the guiding bushings or its extensions may comprise an increasing inner diameter.

Further in this aspect, a blade substantially as hereinbefore described may be provided, but comprising at least two guiding bushings. Such an arrangement is suitable especially in cases where a deformation of the blade root portion has already occurred.

With these at least two guiding bushings, it is possible to align the first and second holes of the blade root and the mounting flange respectively, and it is also possible to correct a deformation of the blade root when fitting a first end of two or more guiding bushings in the mounting flange. Therefore, it is possible to obtain the desire alignment of first holes of the blade root portion with second holes of the mounting flange for a blade root portion that has been in a storage position and has been deformed under the blade's own weight.

In another aspect, the invention provides a mounting flange comprising a plurality of second holes, wherein the mounting flange may be adapted to be guided by the first ends of the guiding bushings of the blade root so as to align the second holes of the mounting flange with the first holes of the blade root.

In some embodiments, the mounting flange may comprise a plurality of recesses adapted to be guided by the extensions of the guiding bushings of the blade root so as to align the second holes of the mounting flange with the first holes of the blade root.

In some embodiments, the mounting flange may comprise a plurality of protrusions adapted to be guided by the first ends of the guiding bushings of the blade root so as to align the second holes of the mounting flange with the first holes of the blade root.

In some embodiments, the mounting flange may form part of the blade, in others it may form part of the hub or extender of the wind turbine.

Thus, another aspect of the invention provides a hub for a wind turbine for attachment to a blade substantially as hereinbefore described, the hub comprising a mounting flange substantially as hereinbefore described.

In some embodiments, the hub may further comprise an extender. In these cases the mounting flange may preferably be arranged on the extender.

Additionally in this aspect, the invention provides a wind turbine rotor comprising a hub substantially as hereinbefore described and at least one blade substantially as hereinbefore described. In some embodiments the wind turbine rotor may further comprise an extender substantially as hereinbefore described.

In a further aspect, the invention provides a method of coupling a blade substantially as hereinbefore described to a mounting flange substantially as hereinbefore described, the method comprising the steps of fitting the first ends of the guiding bushings in the mounting flange thereby aligning the first holes of the blade root with the second holes of the mounting flange using the first ends of the guiding bushings, and fastening the blade root to the mounting flange.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

A blade for a wind turbine, a hub and/or extender of a wind turbine rotor as well as a method of coupling a blade root portion to a mounting flange and a method of correcting deformation of the blade root portion are now disclosed with reference to the drawings.

Figure 1A:
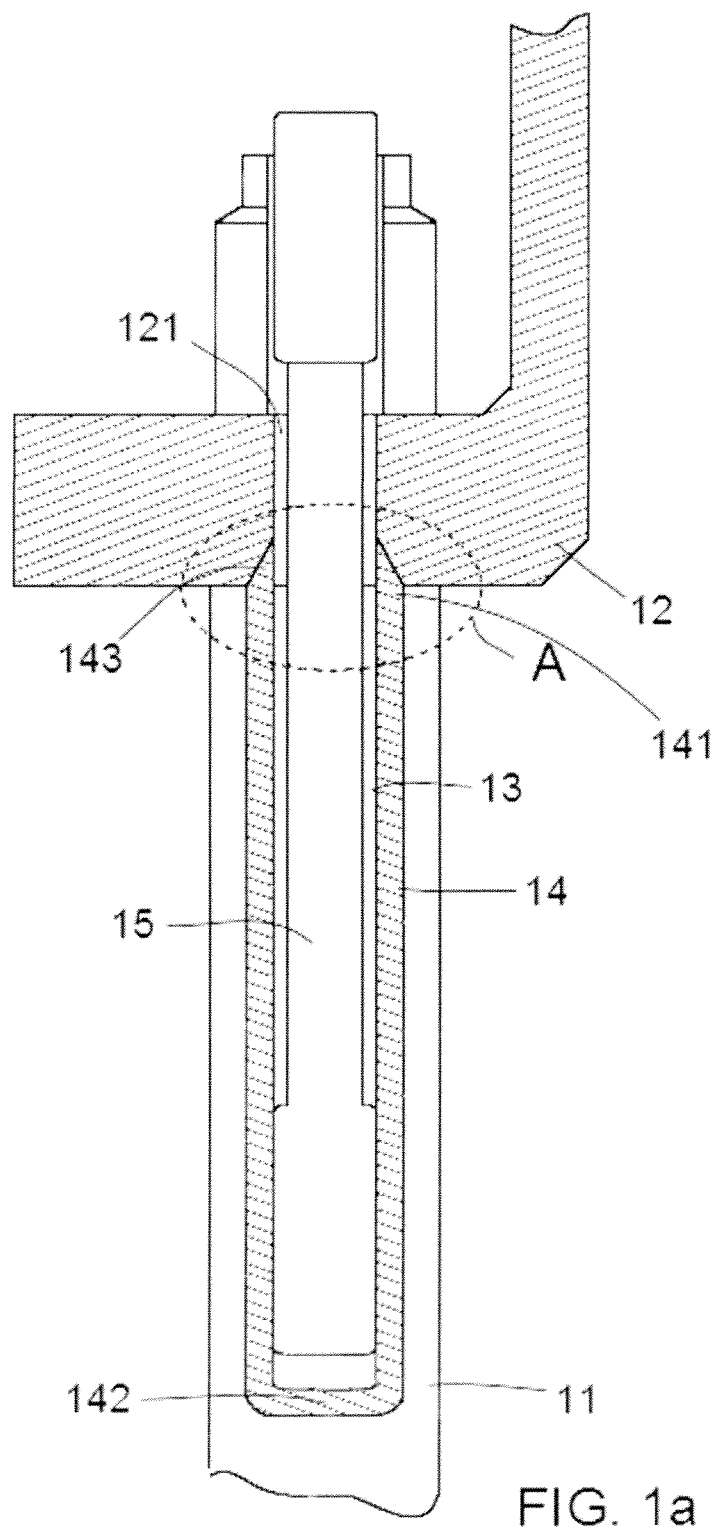
FIG. 1a shows a section view of the attachment of the blade root portion of a blade for a wind turbine to a hub or extender of the wind turbine, according to a first embodiment.
Figure 1B:
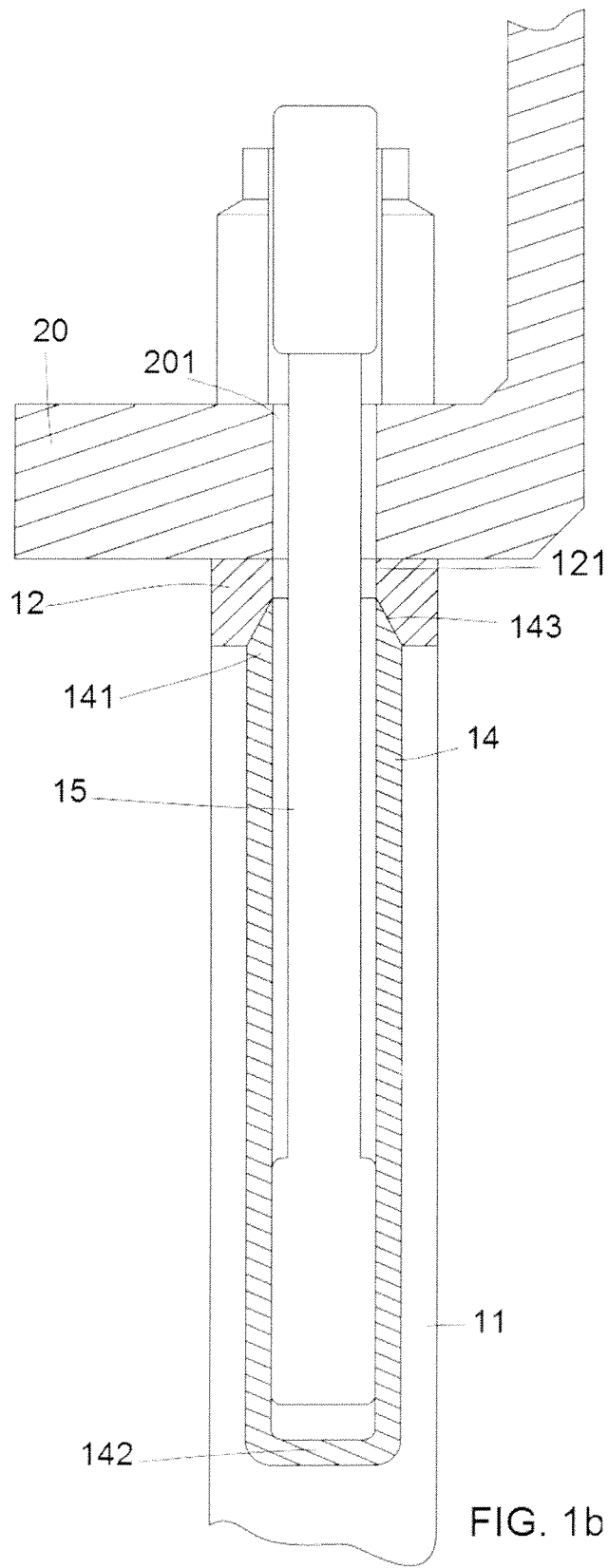
FIG. 1b shows a section view of the attachment of the blade root portion of a blade for a wind turbine to a hub or extender of the wind turbine, according to a second embodiment.

FIGS. 1a and 1b schematically illustrate a cross section of the attachment of a blade for a wind turbine to a hub or extender 20 according to a first and a second embodiment respectively. The blade comprises a blade root portion 11 for coupling to a hub or extender 20 of the wind turbine. The blade root 11 comprises a plurality of first holes 13 provided with an internal bushing 14. The bushing being a guiding bushing 14 that comprises a first end 141 at or near a mounting surface 111 (shown in FIGS. 3 and 4) of the blade root 11 and an opposite second end 142 embedded in their corresponding first hole 13. The first end 141 of the guiding bushing 14 is adapted to guide the blade root 11 with respect to the mounting flange 12.

According to FIG. 1a, one or more guiding bushings 14 may comprise an extension 143 protruding beyond the corresponding first hole 13. As shown in FIG. 1a, the extension 143 may comprise a decreasing outer diameter shape, thus being adapted to guide the blade root 11 with respect to the mounting flange 12 of the hub or extender of the wind turbine.

In addition, as further illustrated in FIG. 1a the mounting flange 12 of a hub or extender may comprise a plurality of second holes 121 and at least one recess (shown in FIG. 2a), for being guided by the extensions 143 of the guiding bushings 14. The recess is complementary to the extension 143. Thereby, the second holes 121 of the mounting flange 12 may be aligned with the first holes 13 of the blade. And considering the fact that in this embodiment the mounting flange 12 forms part of the hub or extender, the hub or extender is aligned with the mounting flange 12. Thus, above mentioned alignment of first holes 13 of the blade root 11 with second holes 121 of the mounting flange 12 enables the insertion of fasteners 15 for securing the blade to the hub or extender.

It should be noted that a mounting flange 12 may form part of a hub or extender, as illustrated in FIG. 1a, or it may form part of the blade as further illustrated in FIG. 1b.

FIG. 1b shows the mounting flange 12 mounted along a periphery of an annular mounting surface 111 (shown in FIGS. 3 and 4) of the blade root portion 11, the mounting flange 12 forming part of the blade.

In these cases, once the mounting flange 12 is mounted on the blade root portion 11 the second holes 121 of the mounting flange 12 will remain aligned with the first holes 13 of the blade root. The mounting flange 12 may preferably be more rigid than the blade. The mounting flange may e.g. be made from a metal. The assembly blade root-mounting flange will not suffer further deformations of its coupling surface. Thus it may be coupled to a hub or extender 20 by means of fasteners 15 inserted through third holes 201 of the hub or extender 20 and through the second 121 and first holes 13 of the assembly blade root-mounting flange.

In these embodiments, the mounting flange may be coupled to the blade root using e.g. a plurality of smaller bolts or screws, although a connection using e.g. adhesives may also be envisaged.

The mounting flange 12 may be made out of any material suitable for providing the blade root with the rigidity required for stopping outwards deformation of the blade root portion 11, when the blade is in a storage position as described above.

Figure 2A:
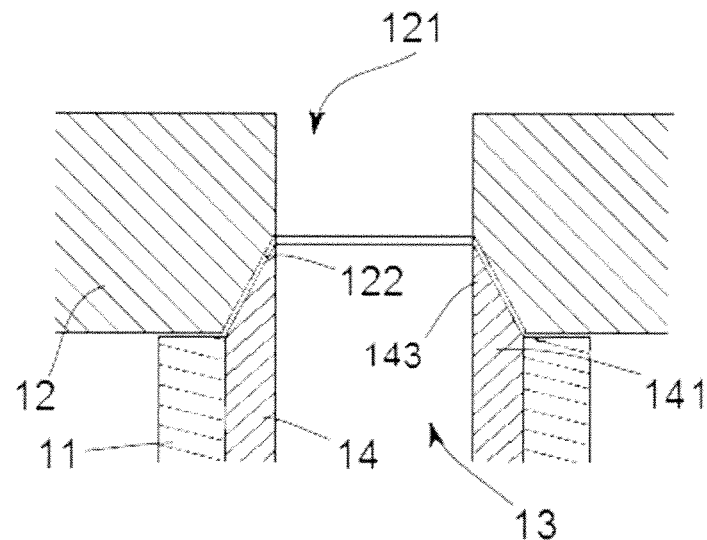
FIG. 2a shows a cross-section of detail A of FIG. 10 according to a first embodiment of the guiding bushings.

FIG. 2a schematically illustrates an enlarged view of detail A. The extension 143 protrudes beyond the first hole 13 in which the guiding bushing 14 is embedded and it is adapted to guide the blade root portion 11 with respect to the mounting flange 12. The extension 143 comprises a decreasing outer diameter shape. The mounting flange 12 comprises a recess 122 that complements the extension 143 of the guiding bushing 14 thereby the first hole 13 of the guiding bushing 14 can be aligned with the second hole 121 of the mounting flange 12.

Figure 2B:
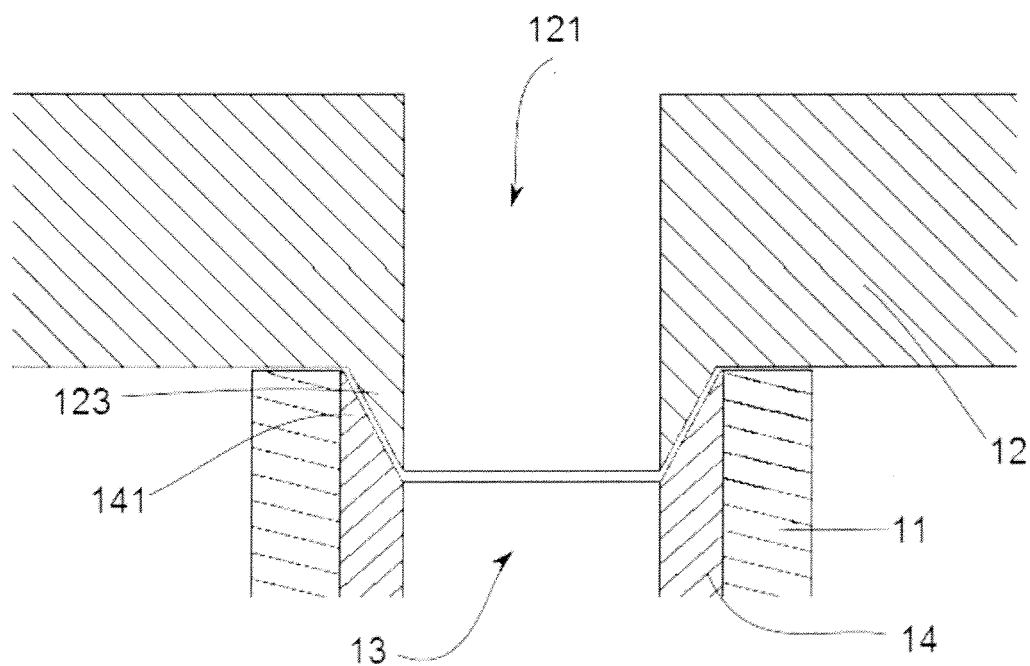
FIG. 2b shows a cross-section of another embodiment of the guiding bushings.

FIG. 2b shows a second embodiment of the guiding bushings 14 wherein the guiding bushing 14 comprises a first end 141 comprising an increasing inner diameter shape. In this embodiment, the mounting flange 12 of the hub or extender may comprise a protrusion 123 for being guided by the first end 141 of the guiding bushing 14.

It will be clear that the exact shape of the first ends 141 of the guiding bushings 14 shown in FIGS. 1a-2b may vary in accordance with circumstances. Various shapes are suitable for guiding the blade root 11 and aligning the first holes 13 of the blade root 11 with the second holes 121 of the mounting flange 12. As shown in FIGS. 1a-2b the first ends 141 and the extensions 143 of the guiding bushings 14 may preferably be of any shape having a cross section comprising a tip. In preferred embodiments, the first ends 141 or extensions 143 may comprise a cross section having at least one substantially right angle.

In those embodiments having guiding bushings 14 comprising extensions 143 at its first ends 141, the extensions 143 may preferably be arranged along a longitudinal axis of the guiding bushing 14.

In those embodiments in which the guiding bushings 14 comprise first ends 141 comprising extensions 143, the extensions 143 are preferably machined with the guiding bushings 14 forming one integral piece.

In alternative embodiments, the extensions 143 may be welded to the guiding bushings 14. In yet further embodiments, the extensions 143 may be threaded into the bushing.

In some embodiments, the extensions 143 may be made out of the same material as the guiding bushings 14. In other embodiments they may also be made out of a material different than that of the guiding bushings 14, said material may be selected e.g. for providing improved performance in terms of stiffness and/or frictional properties.

Figure 3:
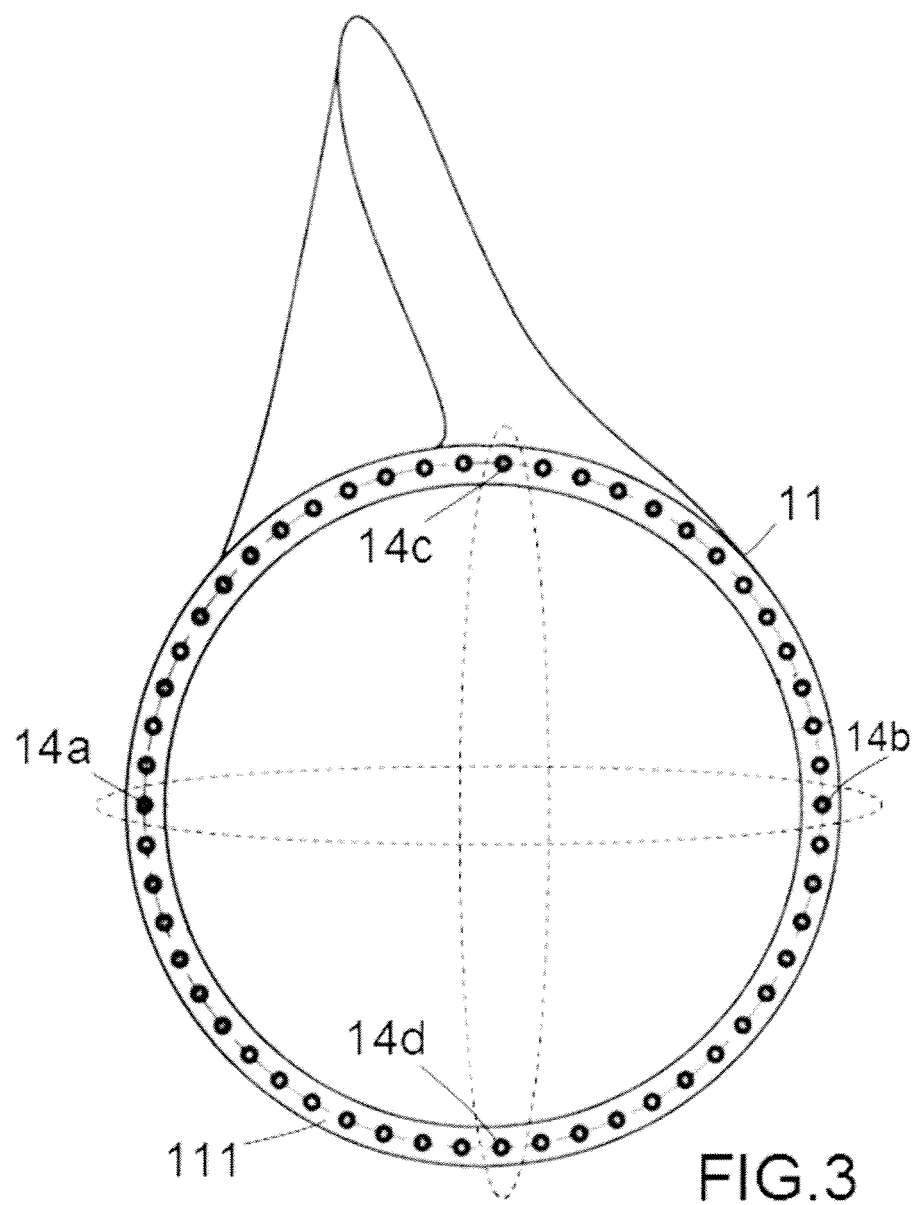
FIG. 3 illustrates a preferred embodiment of a blade according to the present invention.
Figure 4:
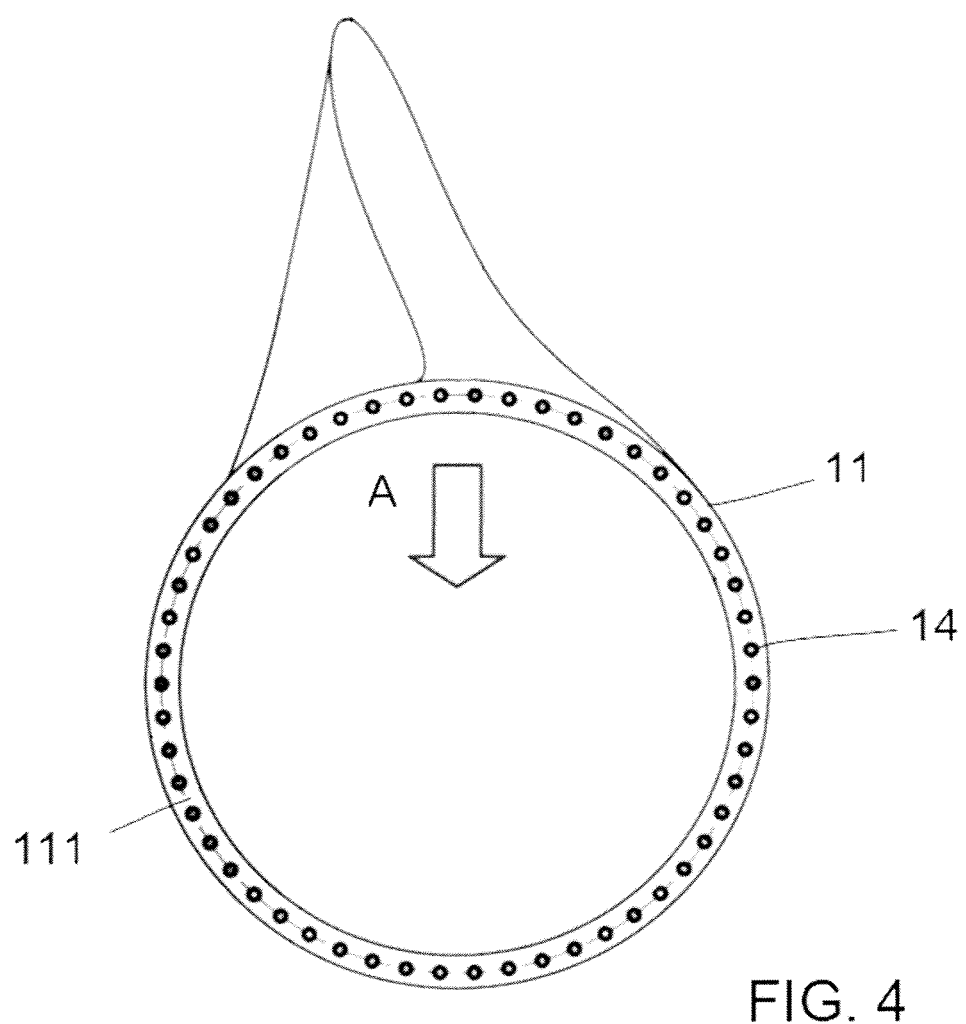
FIG. 4 illustrates a blade for a wind turbine in a storage position.

FIG. 3 illustrates a blade for a wind turbine in a storage position according to a preferred embodiment comprising four guiding bushings 14a-14d comprising each a first end adapted to guide the blade root 11 with respect to a mounting flange. As represented, these guiding bushings 14a-14d may be arranged in a cross configuration along the blade root annular mounting surface 111. Thus, a first guiding bushing 14a and a second guiding bushing 14b are located at substantially diametrically opposite positions. And a third guiding bushing 14c and a fourth guiding bushing 14d are located at substantially diametrically opposite positions, the third and fourth guiding bushings 14c-14d being located along an imaginary line that is perpendicular to an imaginary line between the first and second guiding bushings 14a-14b.

In further embodiments, only two guiding bushings may be provided. In other embodiments, three, five, six or any other number of guiding bushings may be provided. In some embodiments, all bushings may be guiding bushings.

The exact number of guiding bushings may depend on cost considerations, whether there is any deformation in the blade, and how much deformation there is, and even where this deformation may be located.

When a blade root portion is coupled to a mounting flange, the holes in the mounting flange may automatically be aligned with the holes in the blade root. Additionally, depending on the possible deformation in the blade, when at least two guiding bushings are used, the deformation in the blade may at least partially be corrected by merely coupling the blade root to a mounting flange. After coupling the blade root to a mounting flange of e.g. the hub, they may be fastened together using any suitable fastening means such as bolts, studs, rods or pins. Particularly, when the mounting flange forms part of the blade itself, not of a hub or extender, smaller bolts or adhesive means may be used for fastening the mounting flange to the blade root portion.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A blade connection assembly for a wind turbine comprising:
   a mounting flange;
   a blade comprising a blade root portion, the blade root portion attached to the mounting flange, the blade root portion comprising a plurality of first holes each provided with an internal bushing, each of the internal bushings comprising a first end at or near a mounting surface of the blade root portion and an opposite second end embedded in their corresponding first holes,
   wherein one or more of the internal bushings are guiding bushings the first ends of the guiding bushings comprising a decreasing outer diameter configured within the mounting flange or an increasing inner diameter so as to guide the blade root portion with respect to the mounting flange.

2. The blade connection assembly according to claim 1, wherein the first end of the guiding bushings comprises an extension protruding beyond its corresponding first hole, the extension being adapted to guide the blade root portion with respect to the mounting flange, wherein the extension of the guiding bushings comprises a decreasing outer diameter or an increasing inner diameter.

3. The blade connection assembly according to claim 2, wherein the extension is machined with the guiding bushings, thereby forming one integral piece.

4. The blade connection assembly according to claim 2, wherein the extension is welded to the guiding bushing.

5. The blade connection assembly according to claim 1, comprising at least two guiding bushings.

6. The blade connection assembly according to claim 1, wherein the mounting flange comprises a plurality of second holes, and wherein the mounting flange is adapted to be guided by the first ends of the guiding bushings of the blade root portion so as to align the second holes of the mounting flange with the first holes of the blade root portion.

7. The blade connection assembly according to claim 6, wherein the mounting flange comprises a plurality of recesses or protrusions adapted to be guided by the first ends of the guiding bushings of the blade root portion so as to align the second holes of the mounting flange with the first holes of the blade root portion.

8. A hub for a wind turbine for attachment of a blade connection assembly according to claim 1, wherein the hub comprises the mounting flange for attachment of the blade root portion, the mounting flange comprising a plurality of second holes, wherein the mounting flange is adapted to be guided by the first ends of the guiding bushings of the blade root portion so as to align the second holes of the mounting flange with the first holes of the blade root portion.

9. An extender for a wind turbine for attachment of a blade connection assembly according to claim 1, wherein the extender comprises the mounting flange for attachment of the blade root portion, the mounting flange comprising a plurality of second holes, wherein the mounting flange is adapted to be guided by the first ends of the guiding bushings of the blade root portion so as to align the second holes of the mounting flange with the first holes of the blade root portion.

10. A wind turbine rotor comprising the blade connection assembly according to claim 1 and a hub.

11. A wind turbine rotor comprising the blade connection assembly according to claim 1 and a hub comprising the mounting flange for attachment of the blade root portion, wherein the mounting flange comprises a plurality of second holes, and the mounting flange is adapted to be guided by the first ends of the guiding bushings of the blade root portion so as to align the second holes of the mounting flange with the first holes of the blade root portion.

12. A wind turbine rotor comprising the blade connection assembly according to claim 1, an extender for attachment of the blade and a hub, wherein the extender comprises the mounting flange, the mounting flange comprising a plurality of second holes, wherein the mounting flange is adapted to be guided by the first ends of the guiding bushings of the blade root portion so as to align the second holes of the mounting flange with the first holes of the blade root portion.

13. A method of coupling a blade root portion of the blade connection assembly according to claim 1 to the mounting flange, wherein the mounting flange comprises a plurality of second holes, the method comprising:
   guiding the mounting flange by the first ends of the guiding bushings of the blade root portion so as to align the second holes of the mounting flange with the first holes of the blade root portion;
   fitting the first ends of the guiding bushings in the mounting flange thereby aligning the first holes of the blade root portion with the second holes of the mounting flange using the first ends of the guiding bushings of the blade root portion, and
   fastening the blade root portion to the mounting flange.

* * * * *